United States Patent [19]

Koch

[11] 3,990,688

[45] Nov. 9, 1976

[54] GRAPPLE SKIDDER WITH SELF-CENTERING GRAPPLE SUPPORT MECHANISM

[75] Inventor: Stanislaus H. Koch, London, Canada

[73] Assignee: Clark Equipment Company, Buchanan, Mich.

[22] Filed: June 13, 1975

[21] Appl. No.: 586,827

Related U.S. Application Data

[62] Division of Ser. No. 240,063, March 31, 1972, Pat. No. 3,946,882.

[52] U.S. Cl. .............................................. 267/150

[51] Int. Cl.$^2$ .............................................. F16F 15/06

[58] Field of Search ............ 267/150; 403/225, 220, 403/221, 222, 228, 229

[56] References Cited

UNITED STATES PATENTS

| | | | |
|---|---|---|---|
| 3,708,191 | 1/1973 | Hegedus | 267/150 X |
| 3,933,012 | 1/1976 | Ketchum | 403/225 X |

*Primary Examiner*—Stanley H. Tollberg
*Attorney, Agent, or Firm*—Harry G. Thibault

[57] ABSTRACT

A material handling vehicle, especially a log skidder, having articulated front and rear sections and a boom mounted on the rear section which pivotally supports a material handling member such as a grapple adapted to seize the ends of logs to be moved by the skidder. The grapple hangs from the end of the boom on a self-centering mechanism which includes a plurality of first circular discs, a plurality of second circular discs interleaved therewith with the uppermost disc being fixed and interacting between discs, a plurality of spring elements which resist rotation of the grapple in either direction about the grapple turning axis tending to return it to a normally centered position relative to the centerline of the vehicle without operator assistance.

3 Claims, 6 Drawing Figures

GRAPPLE SKIDDER WITH SELF-CENTERING GRAPPLE SUPPORT MECHANISM

This is a division of application Ser. No. 240,063, filed 31 Mar. 1972, which issued as U.S. Pat. No. 3,946,882 on 30 Mar. 1976.

BACKGROUND OF THE INVENTION

1. Field of the Invention

The invention pertains to the art of material handling vehicles and particularly to logging vehicles of the type generally known as log skidders.

2. Description of the Prior Art

There are two general types of log skidders depending on the boom configuration and its function. The rotary boom skidder has a boom movable through an arc allowing the operator to reach to the right or left of the vehicle to pick up trees which are not in the direct path of the machine. These machines have considerable flexibility, but there is an inherent instability problem in trying to grasp trees which are not in the direct line of the machine.

Other skidders employ a rigid boom which does not rotate but may be pivoted in a vertical plane to position the grapple over the end of the log. Only the grapple rotates and the machine must be driven to the tree. There is not a stability problem because the axis of the tree is approximately in line with the natural stability axis of the machine when seized by the grapple.

Either type of machine will usually have a wench-drawn cable passing over a fairlead on the boom with chokers on the end of the cable for skidding logs which cannot be reached by the grapple.

With an articulated vehicle it is usually not too difficult to align the log with the axis of the skidder's rear section, but more often than not the operator must dismount the machine and rotate the grapple by hand so that it is properly aligned and can be lowered to grasp the log. On the average, it may take an operator thirty seconds to alight from the machine, walk to the rear, align the grapple, return to his seat and lower the boom in position for grappling the logs. Decreasing the grapple skidding time is obviously a desirable objective since it increases productivity of the logging operation.

In one case it has been proposed to mount the grapple on an hydraulic motor at the end of the boom which is controlled from the cab of the skidder to hydraulically swivel the grapple to lie transversely of the log. This arrangement however requires complicated valving and overload protective devices to insure against damaging the hydraulic motor and grapple when the log swings to the right or left of the line of travel since the operator cannot be responsible for watching the load while driving the skidder.

SUMMARY OF THE INVENTION

A log skidder having front and rear articulated vehicle sections including a boom on the rear section, a self-centering mechanism on the end of the boom from which the grapple hangs, and torsional resistance members in the self-centering mechanism tending always to return the grapple to a normally centered position without impairing the stability of the vehicle or requiring operator control.

The torsional resistance members comprise a plurality of first circular discs, a plurality of second circular discs interleaved with the first discs, the discs being rotatable about the turning axis of the grapple except for the uppermost disc which is fixed and a plurality of spring elements acting between the discs resisting torsional loading moments in either direction about the turning axis for returning the grapple to a normally centered position.

A plurality of registered openings in the discs enable pins of varying lengths to be inserted so as to connect one or more disc elements for conjoint rotation and to thereby vary either the permissible angular deflection or the torsional resistance according to the conditions encountered.

DETAIL DESCRIPTION

Figure 1:
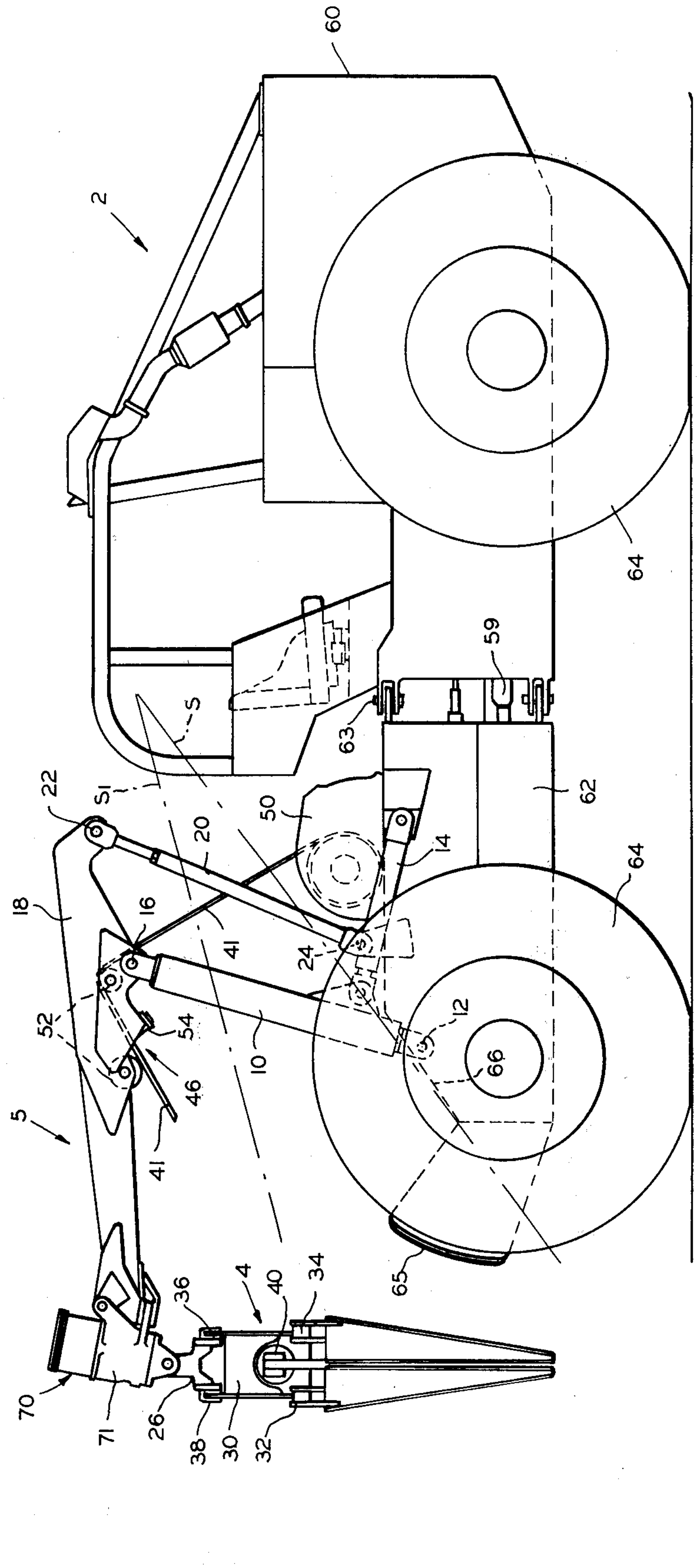
FIG. 1 is a side elevational view of a grapple skidder having a boom pivotally supporting a grapple at the distal end of the boom.

FIG. 1 shows a grapple skidder, four-wheel drive, articulated vehicle 2 having a grapple 4 suspended from a boom 5 which may be pivoted rearwardly in a vertical plane to place the grapple over the end of a log that is then seized and lifted on one end so as to be dragged or skidded by the vehicle. An arch 10 is pivoted at 12 on opposite sides of the frame of the vehicle adjacent the rear. A pair of double acting piston and cylinder motors 14 are connected, one on each side, at the lower leg portion of the arch and extend forwardly for connection to the vehicle frame. Pivotally connected at 16 to the bight portion of the arch 10 is a grapple support arm 18. The rear end of the arm 18 has a clevis to which a pair of adjustable links 20 are pivotally connected at their upper ends, the links extending down and connected at their lower ends to the frame of the vehicle. At this point it will be seen that a four-bar linkage has been formed by the arch 10, support arm 18 and adjustable links 20, such that the boom 5 pivots about parallel upper and lower transverse axes through pivots 12,16, 22, 24. This permits the arm 18 to move along a generally horizontally disposed or flat arc in the vertical center plane of the machine upon actuation of the fluid motors 14. If greater vertical movement of the outer end of the arm 18 is required, then adjustable links 20 can be replaced by a pair of double acting piston and cylinder type fluid motors connected between the pivot points 22–24 although this is not contemplated as being necessary in the normal case. Connected at the outer end of the arm 18 by means of a U-joint 26 is the grapple 4. Grapple 4 includes a spreader frame 30 having laterally spaced lower ends to which a pair of grapple tongs are pivotally connected at 32 and 34. A double acting piston and cylinder type motor 40 is pivotally connected at each end thereof between the tongs and serves to open and close them upon extension and retraction thus opening and closing the grapple for gripping the end of a log. Located in the arm 18 is a fairlead 46 for guiding a cable 41 wound upon the drum of wench 50 which, upon occasion, may be used instead of grapple 4 to engage a log in a known manner. Fairlead 46 includes a pair of generally horizontally disposed rollers 52 and a pair of vertically inclined rollers 54 which guide the cable as it is pulled by the wench. The end of cable 41 is equipped with slip loops or chokers (not shown) which can be placed around the ends of the logs and then wenched up behind the skidder. This forms no part of the present invention and is used more as a back-up system when a log is inaccessible to the grapple.

The fluid motors 14 for pivoting the boom 5 and the motor 40 for operating the grapple 4 are controlled from the cab of the skidder. Because the front and rear sections 60,62 of the machine are articulated, it is normally no problem to drive the skidder into position so that the rear section 62 is in alignment with the log. Consequently, the only requirement for the operator to dismount the machine in the past has been the need to pivot the grapple, which as often as not, had become askew with respect to the log.

In accordance with the present invention the operator is able to control the skidding operation entirely from the cab. There are several factors which combine to make this possible. First is the vehicle construction itself. The skidder 2 has a front engine section 60 to which a rear boom section 62 is articulated about a vertical turning axis 63. The engine in the front section 60 drives the front and rear wheels 64. Articulation of sections 60–62 is accomplished by steering cylinders 59 on opposite sides of the vehicle. This type of steering enables the operator to maneuver the vehicle through the woods and advantageously back the rear section 62 up to the end of a log while the front section remains at an angle. Most preferably, the steering angle is about 90°; 45° each side of the vehicle centerline.

Another factor in the vehicle structure is the provision for greater visibility afforded the operator to the rear. To this end, the rear section 62 has a generally U-shaped bumper 65 through which the operator can see on a line of sight S passing from his position in the cab along a rear frame portion 66 which inclines downwardly so that the operator has direct visibility of the grapple immediately behind the vehicle as well as to a considerable distance to the rear as indicated by the line of sight S-1 which passes through the arch 10 at a higher level.

Still another feature is the arrangement by which the boom arm 18 is shiftable on a horizontal arc above the direct line of sight of the operator as defined by the lines S,S-1.

In addition to the foregoing vehicle structural features, another, and important factor, enabling the operator to conduct the skidding operation entirely from the cab, is the self-centering feature of the grapple. The present invention provides that the grapple 4 automatically repositions itself to a centered position lying in a plane transversely to the centerline of the vehicle after releasing a load, owing to the self-centering mechanism 70. Thus the operator is able to utilize the maneuverability of the skidder to maximum advantage. In the operation of seizing a log, it is only necessary to back the vehicle's rear section 62 into alignment with the log. The grapple will be already positioned for grappling the log owing to the centering mechanism 70 carried on the end of the arm 18.

Figure 2:
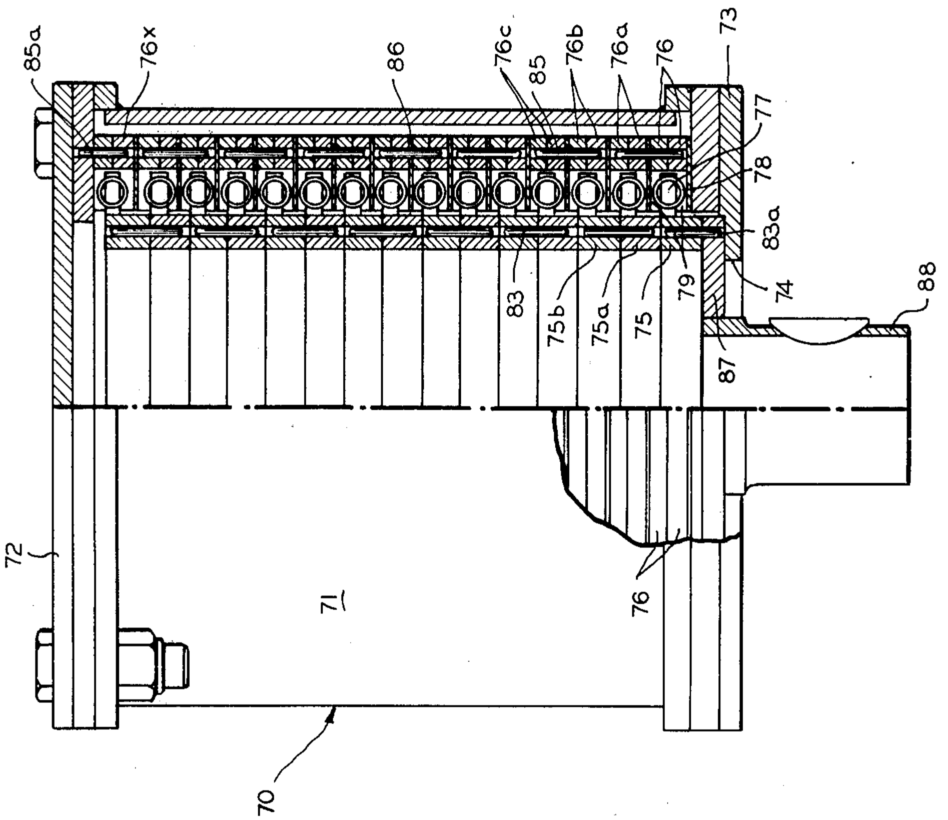
FIG. 2 is a partial vertical sectional view of the selfcentering mechanism which pivotally supports the grapple on the boom showing the internal arrangement of torsional resistance members and locking pin connections thereof.
Figure 3:
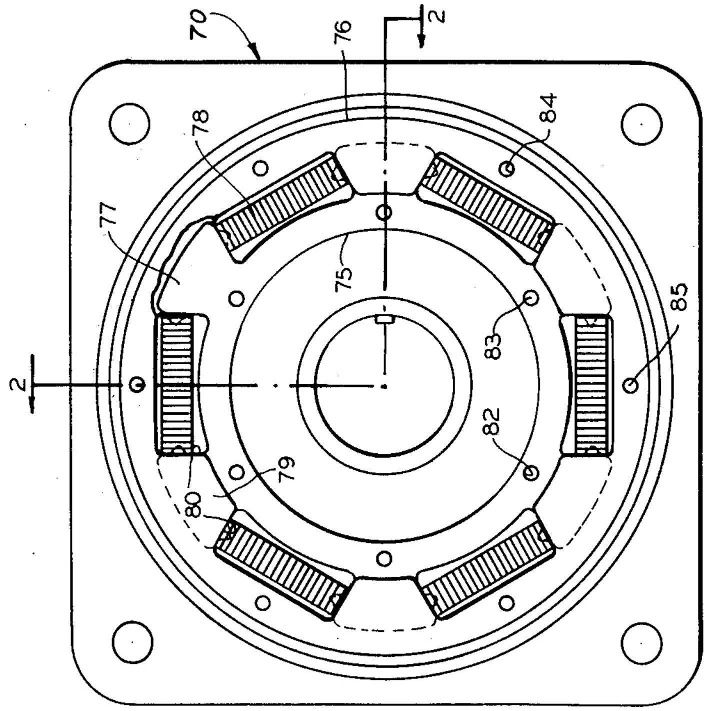
FIG. 3 is a cross-sectional view of the centering mechanism.
Figure 4:
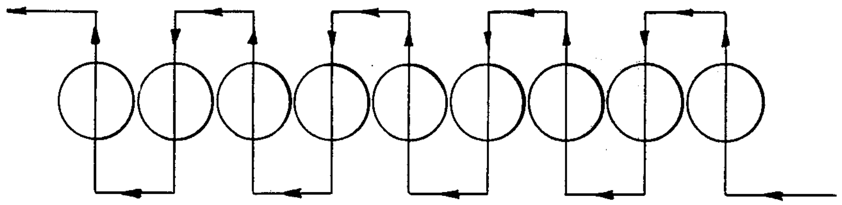
FIGS. 4, 4a and 4b are respectively diagrams showing a series, parallel, and series parallel connection of the torsional resistance members according to various locking pin arrangements.

Referring now to FIGS. 2 and 3, the centering mechanism 70 includes a cylindrical housing 71 having a top plate 72 bolted thereto and a bottom plate 73 having an aperture 74 centered on the housing axis. Within the housing is a torsional resistance assembly comprising a stacked array of inner and outer annular plates or discs 75–76 respectively. Two outer discs 76 are grouped with each inner disc 75 for a total of 15 torsional resistance groupings in the stack shown in FIG. 2, however, it will be appreciated that a greater or fewer number of groups may be employed depending upon the torsional resistance or angular deflection desired as will be apparent hereinafter. The inner discs 75 each has a plurality of radially projecting lugs 77 (FIG. 3) between which are mounted coil springs 78. The outer discs 76 each has a plurality of radially inwardly projecting ears 79 overlying each lug 77 of the inner discs and having opposite faces 80 angled so as to bear against the ends of the adjacent coil springs 78. The inner discs have a circular row of registered openings 82 which receive locking pins 83. The outer discs have a circular row of registered openings 84 which receive holding pins 85. Between adjacent disc groups is an annular anti-friction disc 86 (FIG. 2) made of a nonmetallic material. The angular deflection permitted of the inner discs 75 within each group before complete depression of the springs 78 occur is about 10° and thus for a stack height of 15 groups the total angular deflection in either direction from the neutral axis is about 150°. By selecting different lengths of locking pins 83–85 however the amount of angular deflection may be changed but with a corresponding change in the torsional resistance. For example, locking pins 83–85 as shown in FIG. 2 are in what may be termed a series connection producing a spring reaction as diagramatically depicted in FIG. 4. As shown in FIG. 2 the disc 75 in the first torsional resistance group is pinned to the adapter plate 87 having a shank 88 keyed to the upper yoke of the U-joint 26 from which the grapple is suspended. It will be noted that the first pin **83*a* which connects the first disc 75 with the adapter plate 87 does not extend into the next disc 75*a* and the remaining pins 83 connect adjacent pairs of inner discs as shown. The first outer pair of discs 76 is pinned to the second pair of outer discs 76*a* immediately above. The companion inner disc 75*a* which is interleaved with the outer pair of discs 76*a* is itself pinned to the next inner disc 75*b* and so on up the stack, producing what is termed a series type spring reaction as depicted in FIG. 4. The uppermost pin 85*a* locks the topmost pair of outer discs 76*x* to the housing 71 which is prevented from rotation about the turning axis of the grapple by connection with the boom arm 18 (FIG. 1). The straight series combination as depicted in FIGS. 2 and 4** produces a maximum angular deflection with minimum torsional resistance.

Figure 4A:
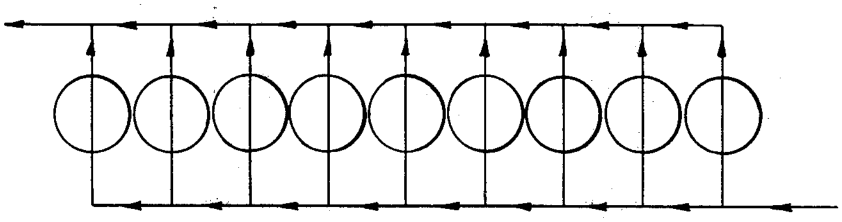

In case it is desired to change the angular deflection relative to the torsional resistance it is only necessary to change the length of the locking pins. For example, if it is desired to have maximum restraining torque with minimum deflection then all of the inner discs **75, 75*a*, 75*b*, etc. are locked together and likewise all of the outer disc pairs 76, 76*a*, etc. are similarly locked together producing a parallel spring reaction as depicted in FIG. 4*a*.** In this arrangement the maximum angular deflection is only 10° in either direction from neutral but the resistance to torsional movement is greatest.

Figure 4B:
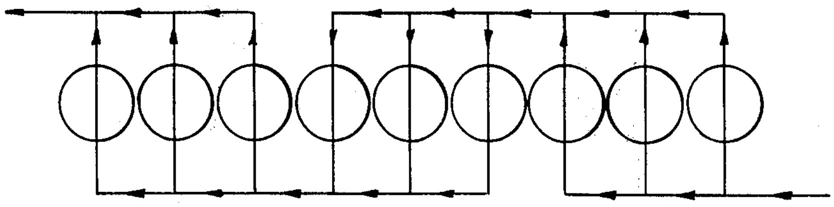

Or, by providing still different length pins, the centering mechanism will produce an intermediate series-parallel spring reaction as depicted in FIG. 4*b*. For example, in such an arrangement the pins 83 inserted in the adapter plate 87 will be long enough to carry the first three inner discs 75, 75*a*, and 75*b*. The pins 84 for the outer disc pairs will be long enough to lock the first three outer pairs 76, 76*a*, 76*b* plus the next pair 76*c* so that the springs are compressed in ring groups of three, producting a total angular deflection of 50° in either direction from neutral, or only one-third of the maximum. However, the torsional resistance is three times as great as it would be in the straight series connection depicted in FIG. 4.

From this it will be seen that the grapple 27 is self-centering inasmuch as the mechanism 70 is mounted so that its neutral axis is aligned with the centerline of the skidder. When the operator has maneuvered the vehicle into position with the rear section 62 aligned generally with the axis of a log, it is then only necessary to extend the arm 18, lowering the grapple tongs to the ground since they are automatically positioned transversely of the log. Once the log is clamped and brought forward into hauling position by retracting the arm 18 there is no difficulty encountered in dragging or skidding the log since the grapple is free to rotate up to 150° in either direction from the neutral plane. This will accommodate any swing or turning motion of the logs relative to the skidder without impairing the vehicle stability.

While I have described and illustrated herein one form of this invention, it will be appreciated that other mechanisms may be devised which employ my inventive concept. It should therefore be understood that I intend to cover by the appended claims all mechanisms and modifications as fall within the full spirit and scope of my invention.

I claim:

1. A centering mechanism comprising a plurality of first circular discs, the uppermost of which is fixed, a plurality of second circular discs interleaved with the first discs, the lowermost of which is connected to a material handling member, and resilient means acting between said discs resisting relative angular deflection in either direction about the turning axis for returning said member to a normally centered position.

2. A centering mechanism according to claim 1 wherein there is provided a plurality of radial inner projections on said first disc elements, a plurality of radial outer projections on said second disc elements, said projections having a radially overlapped relationship and limited circumlinear rotational movement relative to each other, and said resilient means positioned between said radial projections for resisting said relative rotation thereof.

3. A centering mechanism according to claim 2 wherein there is provided a plurality of registered openings between adjacent first and second disc elements and a plurality of pin means insertable in said registered openings to couple adjacent disc elements to selectively vary either the torsional resistance or angular deflection.

* * * * *